United States Patent
Lynch et al.

(10) Patent No.: US 6,194,070 B1
(45) Date of Patent: Feb. 27, 2001

(54) SURFACE TREATED BARIUM SULFATE AND METHOD OF PREPARING THE SAME

(75) Inventors: Thomas J. Lynch; Gary M. Freeman, both of Macon; Christina D. Prowell, Warner Robins; Dwayne E. Outlaw, Danville, all of GA (US)

(73) Assignee: J. M. Huber Corporation, Edison, NJ (US)

( * ) Notice: Subject to any disclaimer, the term of this patent is extended or adjusted under 35 U.S.C. 154(b) by 0 days.

(21) Appl. No.: 09/288,903

(22) Filed: Apr. 9, 1999

(51) Int. Cl.$^7$ ........................................................ B32B 5/00
(52) U.S. Cl. ........................ 428/405; 523/209; 523/212; 524/423; 524/567; 524/570
(58) Field of Search ............................ 428/405; 524/423, 524/567, 570; 523/209, 212

(56) References Cited

U.S. PATENT DOCUMENTS

| | | | |
|---|---|---|---|
| 3,944,705 | * | 3/1976 | Fujioka et al. ........................ 428/331 |
| 4,263,051 | * | 4/1981 | Crawford et al. ............... 106/308 Q |
| 4,505,755 | | 3/1985 | Shinozuka et al. ............... 106/308 B |
| 4,551,497 | | 11/1985 | Shinozuka et al. ................... 524/423 |
| 4,818,614 | * | 4/1989 | Fukui et al. .......................... 428/403 |
| 5,393,437 | | 2/1995 | Bower . |
| 5,401,570 | * | 3/1995 | Heeks et al. ......................... 428/332 |

FOREIGN PATENT DOCUMENTS

| | | |
|---|---|---|
| 5-112430 | * 5/1993 | (JP) . |
| 08268840 | 10/1996 | (JP) . |
| 09003211 | 1/1997 | (JP) . |
| 10045523 | 2/1998 | (JP) . |

OTHER PUBLICATIONS

Abstract JP 5–112430, May 1993.*

* cited by examiner

*Primary Examiner*—Margaret G. Moore
(74) *Attorney, Agent, or Firm*—Carlos Nieves

(57) ABSTRACT

A method of preparing a surface treated barium sulfate product is disclosed which has improved dispersibility in end use applications such as polymeric formulations. The method includes mixing a silicon-hydride containing polysiloxane, in neat or in aqueous emulsion form, with a quantity of barium sulfate particles and then optionally drying the resultant mixture. The silicon-hydride containing polysiloxane is deposited on and chemically bonded to the surface of the barium sulfate particles.

27 Claims, 2 Drawing Sheets

SURFACE TREATED BARIUM SULFATE AND METHOD OF PREPARING THE SAME

TECHNICAL FIELD

This invention relates to surface treated barium sulfate and, more particularly, to a surface treated barium sulfate product that provides desirable performance properties and improved processing in polymeric end use applications. The invention also relates to a method of preparing such a surface treated barium sulfate product.

BACKGROUND OF THE INVENTION

Natural barium sulfate (also commonly referred to as barite or barytes) is frequently used as an extender pigment and/or filler due to its chemical inertness (in both acid and alkali environments), high refractive index, low abrasiveness, low oil absorption, and resistance to corrosion. Barium sulfate is also known to promote flame retardancy and smoke suppression in polymeric end use applications. Given their high refractive index, barium sulfates of high brightness are desirable to use as a replacement for titanium dioxide ($TiO_2$) in certain compositions such as pigmented polymeric compounds. Barite can be utilized to replace a portion of the more expensive $TiO_2$ pigment without having a deleterious impact on the compound's brightness and whiteness properties. Synthetic, precipitated barium sulfate pigments are used in a like fashion, but are typically available in finer particle size grades versus the mechanically ground, natural barites. Precipitated barium sulfate is commonly referred to as blanc fixe.

Despite barium sulfate's many end use advantages, it is not readily wetted or dispersed in organic based formulations such as polymeric compounds given its inert inorganic surface. Accordingly, lengthy processing times are typically required to obtain desired levels of dispersibility of the barite in such compounds. Further, fine and ultrafine particle barites in dry form tend to cake when stored and/or transported. Caking creates processing problems when the barite particles are added to end use formulations via automated dry feeders and the like.

SUMMARY OF THE INVENTION

The present invention is designed to overcome the deficiencies discussed above. It is an object of the invention to provide a surface treated barium sulfate product that is adapted to be readily dispersed in end use applications such as polymeric formulations. Good wet out and dispersion in polymers is important to the inventive product yielding improved processability during compounding and improved extension/spacing of $TiO_2$.

It is a further object of the invention to provide such a treated barium sulfate product which when added to a polymeric compound does not have a deleterious impact on the physical properties of such compound.

It is another object of the invention to provide a method of treating a barium sulfate product with a hydrogen reactive polysiloxane that promotes improved manufacturing quality and consistency. Such hydrogen reactive polysiloxanes contain silicon-hydride groups as the reactive moiety.

In accordance with the illustrative embodiments and demonstrating features of the present invention, there is provided a surface treated barium sulfate product particularly suited for use in polymeric compositions such as those derived from a polyvinyl chloride or a polyolefin. The product comprises a plurality of barium sulfate particles and a silicon-hydride containing polysiloxane. This hydrogen reactive polysiloxane is deposited on the surface of the barium sulfate particles and bonds to this surface through means of a chemical reaction involving its reactive Si—H groups. The treatment level of the silicon-hydride containing polysiloxane can range from about 0.1% to about 2.0% by weight, but is preferably from about 0.5% to about 1.5% by weight on an active weight basis.

DETAILED DESCRIPTION OF PREFERRED EMBODIMENTS

In accordance with the preceding summary, the present invention is directed toward a surface treated barium sulfate product that provides improved dispersibility in polymeric end use applications resulting in reduced processing times.

In the preferred embodiment a dry ground natural barite is subsequently surface treated in the manner more fully described below. However, it should be noted that precipitated barium sulfates or wet ground barites can also be surface treated by the inventive method to yield similar benefits. Table I sets forth some mineral properties of a typical dry ground barium sulfate. Table II sets forth some physical properties of four different, dry ground barite products available under the mark Huberbrite® from J.M. Huber Corporation.

TABLE I

| Mineral Properties | |
| --- | --- |
| Morphology | Blocky |
| Refractive Index | 1.64 |
| Specific Gravity | 4.50 |
| Mohs Hardness | 3.0–3.5 |
| Linear Coefficient of Expansion ($10^{-6}/°$ C.) | 10 |
| Solubility (g/100 ml) | 0.00025 |
| Dielectric Constant | 11.4 |
| Bulking Value (gal/lb) | 0.027 |

TABLE II

| General Specifications | Huberbrite 1 | Huberbrite 3 | Huberbrite 7 | Huberbrite 10 |
| --- | --- | --- | --- | --- |
| Moisture, 105° C. (max), % | 0.20 | 0.10 | 0.10 | 0.10 |
| Screen residue, 325 mesh (max), % | 0.05 | 0.005 | 0.01 | 0.6 |
| pH (100 g/250 ml $H_2O$) | 8.5–9.5 | 8.5–9.5 | 8.5–9.5 | 8.5–9.5 |
| Dry brightness, % reflectance | 94 | 94 | 94 | 93 |
| Hegman Grind | 6.5 | 6 | 4 | 3 |

TABLE II-continued

Typical Physical Properties

| Form | Fine Powder | Fine Powder | Fine Powder | Fine Powder |
|---|---|---|---|---|
| Avg. Stokes equiv. particle diameter, microns | 1.1 | 3.0 | 6.5 | 8.5 |
| Median particle size, LLS, microns | 0.9 | 2.1 | 5.8 | 8.1 |
| Surface area, BET (m$^2$/g) | 3.6 | 1.4 | 0.6 | 0.5 |
| Oil absorption (g/100 g) | 12 | 12 | 12 | 11 |
| Bulk density, loose (lb/ft$^3$) | 60 | 80 | 90 | 100 |
| Bulk density, tapped (lb/ft$^3$) | 90 | 110 | 120 | 130 |

Figure 1:
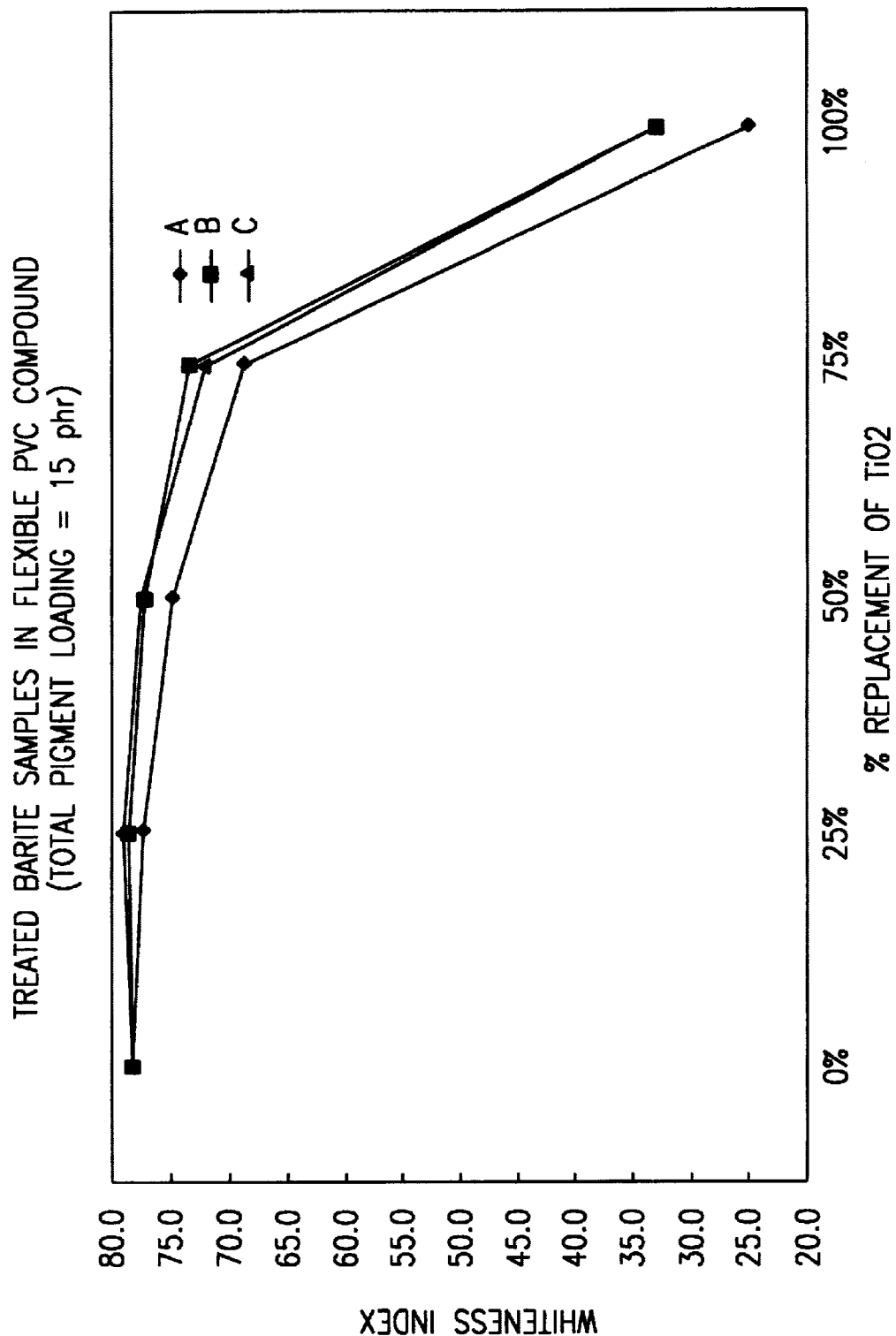
FIG. 1 is a graphical representation displaying the effect of replacing titanium dioxide with a surface treated barium sulfate product of the present invention on the whiteness index of a pigmented PVC compound.
Figure 2:
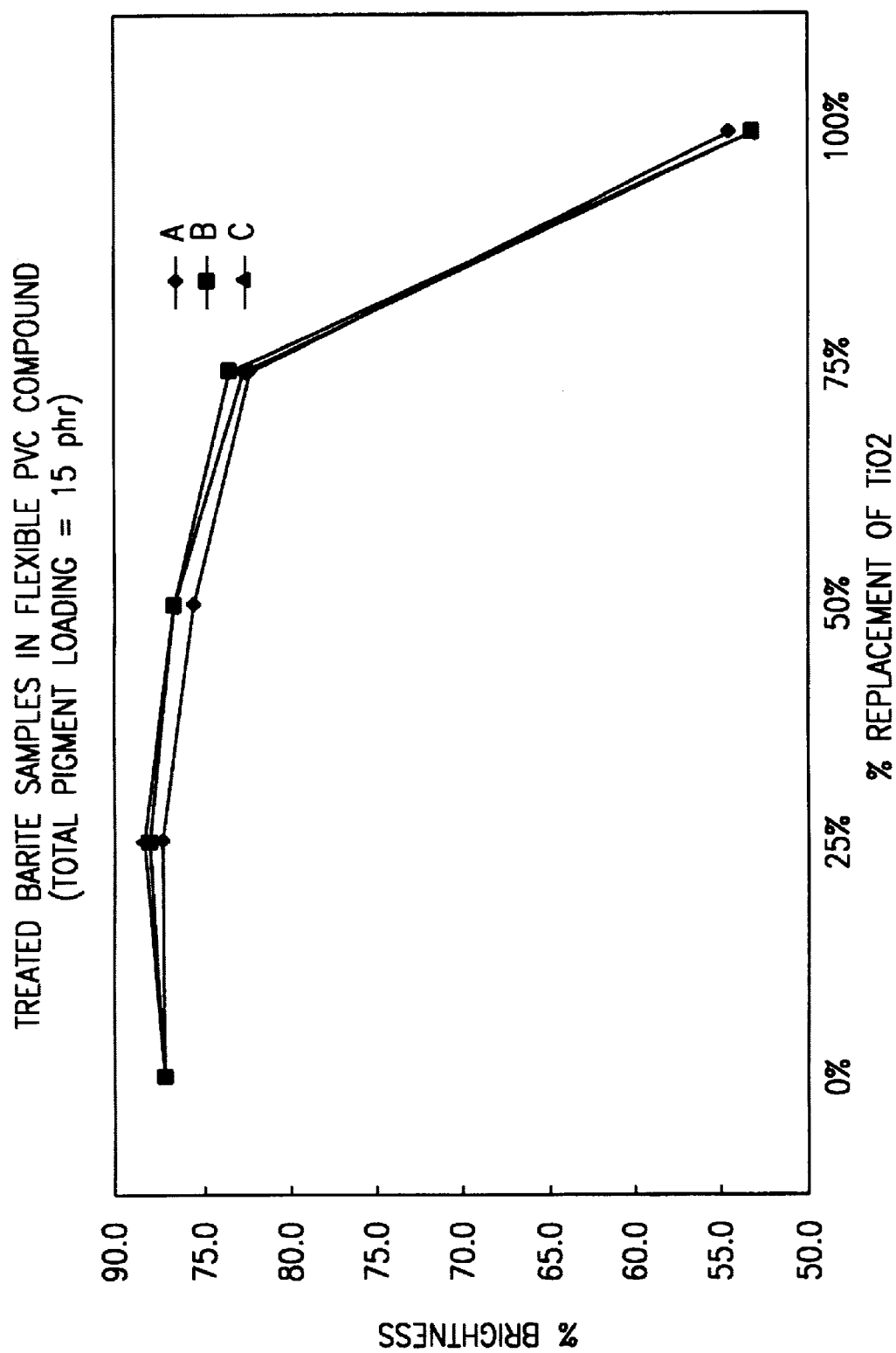
FIG. 2 is a graphical representation displaying the effect of replacing titanium dioxide with a surface treated barium sulfate product of the present invention on the percent brightness of a pigmented PVC compound.

The physical and chemical data reported herein were determined as follows. Specific gravities were determined by helium gas displacement using a Quantachrome 1000 automated pycnometer unit. The moisture content on the barite in wt. % was determined by drying test samples in a forced air oven at 105 deg. C. for approximately 2 hours in accordance with the TAPPI Method T671 cm-85 procedure. Screen residue values for an untreated barite were measured by pouring a well-mixed slurry of the barite through a 325 mesh screen, rinsing, drying and weighing the residue, following the ASTM D-185 procedure. Barite pH values were determined using a standard pH meter on a 28% solids (by weight) mixture of the barite with deionized water in accordance with the ASTM D-1208, E-70 procedure. Dry pigment brightness values in Table II were measured at 530 nm with a magnesium oxide standard equal to 100%, following the ASTM C-110 procedure. The whiteness index and % brightness values shown in FIG. 1 and FIG. 2 are standard TAPPI brightness numbers as determined by reading the PVC test plaques with a Technidyne Micro TB-1C brightness meter in accordance with the TAPPI Method T646 om-86 procedure. Hegman grind values were determined following the standard ASTM D-1210 procedure. The average Stokes equivalent particle diameters in microns were determined by an x-ray sedimentation method based on Stokes Law using a Micromeritics 5100 Sedigraph particle size instrument. The average Stokes equivalent particle diameter is the median particle size (MPS) value determined by the x-ray Sedigraph. The median particle size values, measured by the laser light scattering (LLS) method and reported in microns, were determined using a Malvern Mastersizer/E instrument which is based on Fraunhofer diffraction as generally described in U.S. Pat. No. 5,167,707, incorporated herein by reference, and references cited therein. BET surface areas were determined by the nitrogen absorption method described by Brunauer, Emett, and Teller in the "Journal of the American Chemical Society," Volume 60, page 309, published in 1938. A multi-point surface area determination was made on the barite test samples after outgassing them at 130 deg. C. using a Micromeritics Gemini III 2375 instrument. Oil absorbance values were determined from the grams of linseed oil absorbed per 100 grams of pigment by the rub-out method of ASTM-D281. Loose and tapped bulk densities were determined by the procedures described in ASTM D-1895.

In the preferred embodiment, Huberbrite® 1 barium sulfate is surface treated in accordance with the method of the present invention. The fine particle size of Huberbrite® 1 barium sulfate is well suited when utilized in thermoplastic compounds since the fineness of the particles is important to the resultant physical properties and/or effective spacing of the titanium dioxide pigment.

The ground barite is surface modified with a hydrogen reactive silicone fluid (commonly referred to as a H-siloxane, a hydrogen reactive polysiloxane, or a silicon-hydride containing polysiloxane). The presence of the reactive silicon-hydride (Si—H) groups is essential to the siloxane's effectiveness as a surface treatment agent for the barite. A preferred H-siloxane fluid utilized for surface modification of barium sulfate is a methyl hydrogen polysiloxane (denoted hereafter as Me H polysiloxane). Me H polysiloxanes of low molecular weight (MW<10,000) are particularly preferred as treatment agents. It should be noted that other alkyl hydrogen polysiloxanes and siloxanes of lower reactive hydrogen content can also be utilized.

An illustrative example of the chemical structure of a silicon-hydride containing polysiloxane useful in preparing the surface treated barite products of this invention is set forth immediately below:

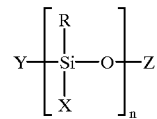

wherein n=an integer greater than 1;

X=H or R';

R or R'=an organic substituent comprising 1 to 20 carbon atoms whereby R and R' are not necessarily the same; and Y and Z=silicon-containing terminating end groups.

In the case where the silicon-hydride containing polysiloxane used for surface treatment is an alkyl hydrogen polysiloxane then in reference to the above chemical structure:

n=an integer greater than 1;

X=H;

R=a C$_1$–C$_{20}$ alkyl; and

Y and Z=silicon-containing terminating end groups.

Finally, in the preferred embodiment where the silicon-hydride containing polysiloxane used for surface treatment is a Me H polysiloxane of low molecular weight, then in reference to the above chemical structure:

n=about 50–80;

X=H;

R=methyl;

Y=(CH$_3$)$_3$SiO—;

Z=—Si(CH$_3$)$_3$.

The surface treated barite of the present invention is prepared by treating either dry, finely divided barite powder or a barite slurry with the H-reactive silicone fluid. Effective surface treatments on the barium sulfate particles can be carried out on either physical form (dry or slurry) by using a neat H-siloxane fluid or by adding an aqueous emulsion of the H-siloxane fluid as more fully described below. Initially, 98 to 99.9 parts by weight of a quantity of barium sulfate (e.g., Huberbrite® 1 barium sulfate) is added to a solids/liquid batch blender. The blender is turned on and 0.1 to 2.0 parts by weight (on an active basis) of the Me H polysiloxane is added respectively over approximately 0.1 to 3 minutes so as to yield a total of 100 parts by weight. The total mixing time is preferably 5 to 40 minutes. The preferred treatment level of the Me H polysiloxane is from about 0.5% to about 1.5% by weight. Optionally, the barite may be heated during the dry treatment and subsequent mixing steps. In the case of surface treating a dry barite powder with Me H polysiloxane at room temperature, the treated barite product should be allowed to sit for a period of about 24–48 hours prior to its use to ensure that the surface reaction is complete. Increasing treated product hydrophobicity and small amounts of $H_2$ gas evolution are typically observed over this time period.

Alternatively, the dry treatment process can be carried out continuously by adding the H-siloxane (neat or as an aqueous emulsion) via a chemical metering pump that is used in combination with a pin mixer, a Bepex turbulizer unit or a similar continuous blending device. If a barite starting material is to be treated in slurry form, the Me H polysiloxane is added slowly to the slurry with good mixing and then mixed for an additional 5 to 30 minutes. The treated barite slurry is then vacuum filtered and subsequently oven dried or flash-dried under conventional drying conditions. Whether surface treated in dry particulate form or in slurry form followed by drying, the treated barite product can be optionally post-pulverized to reduce treated particle agglomeration thereby improving its Hegman grind properties.

In an alternative method, an aqueous emulsion of a Me H polysiloxane is used to surface treat the barium sulfate. The aqueous emulsion is preferably prepared from a high-speed dispersion of the Me H polysiloxane in water in the presence of a surfactant. In a preferred embodiment, the aqueous emulsion comprises Me H polysiloxane in an amount of from about 30% to about 70%, and a nonionic surfactant in an amount of from about 1.0% to about 3.0% of the total formulation (percentages are on an active weight basis).

It has been found that the optimum amount of nonionic surfactant used in preparing the emulsion formulation described above is about 4.0% by weight of the H-siloxane component. Further, preferred nonionic surfactants have a hydrophilic lypophilic balance (HLB) value of greater than 9. A nonionic surfactant particularly suited for emulsifying the Me H polysiloxane is a polysorbitan monolaurate with 20 moles of ethoxylation available under the trade name Alkamuls PSML-20 from Rhodia. In order to obtain sufficient stability, the emulsions are optimally prepared at a 50% by weight concentration of Me H polysiloxane whereby the corresponding weight concentration of Alkamuls PSML-20 utilized therein would optimally be 2%.

Table III sets forth some variable physical properties of the treated barium sulfate product that was produced by surface treating Huberbrite® 1 barium sulfate with 1% by weight of the preferred Me H polysiloxane.

TABLE III

| | Treated Barium Sulfate |
|---|---|
| General Specifications | |
| Moisture, 105° C. (max), % | 0.5 |
| Screen Residue*, 325 mesh (max), | 0.1 |
| Hegman Grind | 4–7 |

TABLE III-continued

| | Treated Barium Sulfate |
|---|---|
| Typical Physical Properties | |
| Form | Fine Powder |
| bulk density, loose (lb/ft$^3$) | 50–60 |
| bulk density, tamped (lb/ft$^3$) | 76–80 |

*Given their very hydrophobic nature, a modified test procedure was used for determining the % screen residue of a treated barite product, as follows: Using 100.0 grams of pigment, a 38% solids dispersion in ethanol was produced and poured through a 325 mesh sieve screen. After washing with an additional 100 gm quantity of ethanol, the residue was dried, collected and then weighed.

Table IV lists a number of barite test samples and their corresponding descriptions.

TABLE IV

| Sample | Description |
|---|---|
| A | 1 micron MPS, dry ground barite* |
| B | 1 micron MPS, dry ground barite* treated with 1.0% Me H polysiloxane** (neat addition) |
| C | 1 micron MPS, dry ground barite* treated with 1.0% Me H polysiloxane** (added as an emulsion) |
| D | 1 micron MPS, dry ground barite* treated with 1.0% isostearic acid*** (neat addition) |
| E | 1 micron MPS, dry ground barite* treated with 1.0% dimethyl siloxane, hydroxy terminated (neat addition)† |
| F | 1 micron MPS, dry ground barite* treated with 1.0% Si—H functional alkyl siloxane†† (neat addition) |
| G | 1 micron MPS, dry ground barite* treated with 1.0% phenyltrimethoxysilane††† |
| H | 1 micron MPS, dry ground barite* treated with 1.0% isobutyltrimethoxysilane†††† |

*Huberbrite® 1 barium sulfate available from J. M. Huber Corporation
**Me H polysiloxane available from Dow Corning under the trade name Silicone Fluid 1107
***Isostearic Acid available from Henkel Corporation under the trade name Emery 873
†Dimethyl siloxane available from Dow Corning under the trade name Silicone Fluid 4-2797
††Alkyl siloxane available from Dow Corning under the trade name Silicone Fluid 2-5084 (has about 50% less Si–H content than Dow Corning Silicone Fluid No. 1107)
†††Phenyltrimethoxysilane available from Sivento Inc.
††††Isobutyltrimethoxysilane available from Sivento Inc.

EXAMPLE 1

PVC Test Recipe

A polyvinyl chloride compound was prepared from 100 parts by weight of a polyvinyl chloride resin (Vista 5385 resin available from Vista Chemical Co.), 50 phr (parts per hundred resin) of a plasticizer (diisodecyl phthalate, Jayflex DIDP available from Exxon Chemical Co.), 5 phr of a heat stabilizer (lead sulfophthalate, Lectro 90 available from Synthetic Products Co.), 1 phr of stearic acid (available from Synthetic Products Co.) and 15 phr of total pigment which consisted of either barite, titanium dioxide or a blend of barite and titanium dioxide. The PVC formulation was prepared in a Brabender mixer using the following mixing procedure.

The PVC formulation was prepared by adding the PVC resin to a Brabender Plasti-corder PL-2100 blender which was heated to 340 deg. F. and stirred at 60 rpm. Once the PVC resin was heated, the plasticizer and heat stabilizer were added followed by stearic acid addition. Mixing and heating was continued until the mixture was uniform at which time either barite or titanium dioxide or a blend of these pigments was added. Torque measurements were taken after 3 minutes. The composite PVC material was then cooled and compression molded at 340 deg. F. and 5,000 psi to form test plaques which were used for optical brightness and color measurements using a Technidyne Micro TB-1C brightness meter.

Table V compares the mixing characteristics of the PVC test recipe described in Example 1 using three sample pigments from Table IV. Table V sets forth the impact on mixing torque when the $TiO_2$ pigment is replaced with various percentages of the barium sulfate test samples.

TABLE V

| Test Sample | Treatment Level | Surface Modifyin Agent | Mixing Torque (in meter-grams) at Various % Replacement levels for $TiO_2$* | | | | |
|---|---|---|---|---|---|---|---|
| | | | 0% | 25% | 50% | 75% | 100% |
| A | — | None | 752 | 758 | 711 | 695 | 920 |
| B | 1% | Me H Poly-siloxane (neat) | 752 | 711 | 700 | 685 | 697 |
| C | 1% | Me H Poly-siloxane (emulsion) | 752 | 691 | 672 | 677 | 677 |

*% values above indicate percent $TiO_2$ replacement with barite; initial loading of $TiO_2$ in PVC compound was 15 phr.

As can be seen in Table V, the processing viscosity of the PVC compounds containing treated barium sulfate (Samples B and C) is significantly lower than the viscosity of the PVC compounds containing untreated barium sulfate at various % replacement levels (as represented by the mixing torque). The lower viscosity results in reduced processing times.

FIG. 1 is graphical representation displaying the effect of replacing titanium dioxide with a surface treated barium sulfate product of the present invention on the whiteness index of the pigmented PVC compound described in Example 1. The samples in FIG. 1 correspond to samples A, B and C in Table IV. FIG. 2 displays a similar representation with respect to % brightness, measured as TAPPI brightness. The whiteness index and % brightness values were both measured on PVC test plaques using the Technidyne Micro TB-1 instrument as previously described.

As is readily apparent from the figures, the replacement of $TiO_2$ (at various percentages) with barium sulfate treated in accordance with the present invention yields higher whiteness and brightness values as compared to $TiO_2$ replaced with untreated barium sulfate in PVC compounds. The improvements in the PVC compound's brightness and whiteness properties can likely be attributed to improved barite pigment dispersion wherein better extension/spacing of the $TiO_2$ is achieved.

Table VI displays average % caking values for each of the test samples described in Table IV, all of which are based on a 1 micron barium sulfate (Huberbrite® 1). For comparison, all the treated barite samples were tested for % caking in a non post-pulverized form. Post-pulverization after surface treatment can affect a treated barite product's relative Hegman grind and caking properties. The test procedure utilized for determining average % caking is as follows: A 12 gram test sample of barite powder was placed inside a 1 inch high by 1⅝ inch inner diameter stainless steel ring which is located on a glass plate. Using a stainless steel plunger, the powder test sample was hand pressed into a firm plaque using 20 pounds of applied pressure for 10 seconds. The test plaque was then transferred onto the top of a 40 mesh US sieve screen that was then vibrated for about 2 minutes using a Sepor Inc. screen shaker unit. The sample was partially disintegrated by this vibrating action with the clumps of material still remaining on the screen representing the amount of product caking on a weight % basis. The screen residue retained was weighed and the % caking value was determined by the following formula:

% caking=(wt. of residue material/original sample wt.)×100

For a given powder sample, the % caking is determined three times and the average value was reported.

TABLE VI

| Test Sample* | % Treatment Level | Surface Modifying Agent | Average % Caking |
|---|---|---|---|
| A | — | None | 64 |
| B | 1% | Me H Polysiloxane (neat) | 4.9 |
| C | 1% | Me H Polysiloxane (emulsion) | 3.3 |
| D | 1% | Isostearic Acid | 60 |
| E | 1% | Dimethyl Siloxane, hydroxy terminated | 63 |
| F | 1% | Si—H functional alkyl Siloxane | 62 |
| G | 1% | PhTMO Silane | 68 |
| H | 1% | IBTMO Silane | 62 |

*All treated barite samples were tested in non post-pulverized form at least 48 hours after having been prepared.

Table VI demonstrates that the surface treatment of a barium sulfate with Me H polysiloxane in accordance with the methods of the present invention results in a product which exhibits a significant reduction in % caking as compared to either an untreated barium sulfate or barium sulfate treated with other surface-modifying materials. The noted reduction in caking reflects improved dry powder flow and bulk dry handling characteristics as well as improved dispersibility of the treated barium sulfate in polymeric end use applications.

EXAMPLE 2

In this example, the effect of post-pulverization on resultant Hegman grind properties and % caking values for the surface treated barite product of this invention is demonstrated. After surface treatment of a barite with a Me H Polysiloxane, post-pulverization of the treated product is an optional process step that can be practiced to provide particle deagglomeration so as to improve the product's dispersibility in organic resin or polymer systems as reflected by an improved Hegman grind value. Treated barite test samples B and C of Table IV were checked for Hegman grind and both were then subsequently pulverized through a micro-pulverizer unit twice using a 0.020 inch screen. The pulverized test samples are hereafter designated as samples B-P and C-P, respectively. The resultant Hegman grind properties and % caking values of B-P and C-P were determined and the data are reported in Table VII.

TABLE VII

| Barite Test Sample | Sample Description | Average % Caking | Hegman Grind |
|---|---|---|---|
| B | Per Table IV in non-pulverized form. | 4.9 | 0–1 |
| C | Per Table IV in non-pulverized form. | 3.3 | 0–1 |
| B-P | Sample B pulverized 2 passes through a 0.020 inch screen. | 44 | 6.0 |

TABLE VII-continued

| Barite Test Sample | Sample Description | Average % Caking | Hegman Grind |
|---|---|---|---|
| C-P | Sample C pulverized 2 passes through a 0.020 inch screen. | 25 | 6.0 |

Table VII clearly demonstrates that pulverization after surface treatment can significantly improve the Hegman grind properties of the treated barite products of this invention but this improvement often comes at the expense of decreasing dry flow properties some as reflected by an increase in the % caking values.

EXAMPLE 3

In this example, barite test sample C of Table IV was prepared again except that the treatment process with Huberbrite® 1 barium sulfate and the Me H polysiloxane as a 50% active emulsion was carried out in a continuos fashion using a Bepex turbilizer unit rather than batch wise in a Henschel mixer. No heating was utilized. The treated barite product so produced at a 1% treatment level by this continuous treatment process is designated hereafter as sample C—C. Immediatly after its production, sample C—C was evaluated in non-pulverized form for average % caking and was re-checked again after 24 hours. The initial % caking value for C—C was determined to be 43% while the same product tested 24 hours later yielded a % caking value of 9.4. These data suggest that the surface reaction between the silicon-hydride containing polysiloxane and the barite particles continues over a period of about 24 hours. Optimum dry flow properties for a treated barite product of this invention are not achieved until this surface reaction is complete.

The present invention may be embodied in other specific forms without departing from the spirit or essential attributes thereof and accordingly reference should be made to the appended claims rather than the foregoing specification as indicating the scope of the invention.

What is claimed is:

1. A surface treated barium sulfate product, comprising a plurality of barium sulfate particles having surfaces and a surface-modifying material bonded to said surfaces via chemical reaction, where the surface-modifying material comprises a polysiloxane represented by the general formula:

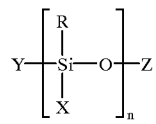

wherein
   n=an integer greater than 1;
   X=H;
   R=a $C_1$ to $C_{20}$ alkyl group; and
   Y and Z=silicon-containing terminating end groups.

2. A surface treated barium sulfate product of claim 1, wherein R is a methyl group.

3. A surface treated barium sulfate product of claim 1, wherein n is about 50–80; R is a methyl group; Y is $(CH_3)_3SiO$—; and Z is —$Si(CH_3)_3$.

4. The surface treated barium sulfate product of claim 1, wherein said barium sulfate particles are selected from the group consisting of dry ground barium sulfate, a slurry of ground barium sulfate and precipitated barium sulfate.

5. The surface treated barium sulfate product of claim 1, wherein said barium sulfate particles have a median particle size of approximately 0.1 to 10 microns.

6. A surface treated barium sulfate product of claim 1, wherein the surface-modifying material consists essentially of said polysiloxane.

7. A method of preparing a surface treated barium sulfate product, consisting essentially of the steps of:
   a) providing a quantity of barium sulfate particles having surfaces;
   b) providing a polysiloxane represented by the general formula:

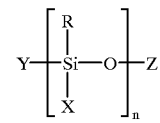

wherein
   n=an integer greater than 1;
   X=H;
   R=a $C_1$ to $C_{20}$ alkyl group; and
   Y and Z=silicon-containing terminating end groups; and
   c) mixing said polysiloxane with said barium sulfate particles in an amount of from about 0.1% to about 2.0% by weight based on the weight of said barium sulfate particles effective to bond said polysiloxane to the surfaces of said barium sulfate particles via a chemical reaction between Si—H groups of the polysiloxane and the surfaces of the barium sulfate particles.

8. The method of claim 7, further including the step of drying said surface treated barium sulfate particles.

9. The method of claim 7, further including the step of pulverizing said surface treated barium sulfate particles.

10. The method of claim 7, wherein said polysiloxane is mixed with said barium sulfate particles in an amount from about 0.5% to about 1.5% by weight based on the weight of said barium sulfate particles.

11. The method of claim 7, further including the step of filtering said surface treated barium sulfate particles prior to the step of drying.

12. The method of claim 7, wherein said barium sulfate particles have an average particle size of from about 0.1 to about 10 microns.

13. The method of claim 7, wherein n is about 50–80; R is a methyl group; Y is $(CH_3)_3SiO$—; and Z is —$Si(CH_3)_3$.

14. A method of preparing a surface treated barium sulfate product, consisting essentially of the steps of:
   a) providing a quantity of barium sulfate particles;
   b) providing a polysiloxane represented by the general formula:

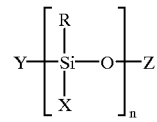

wherein
   n=an integer greater than 1;
   X=H;

R=a $C_1$ to $C_{20}$ alkyl group; and

Y and Z=silicon-containing terminating end groups; and c) mixing an aqueous emulsion of said polysiloxane with said barium sulfate particles in an amount of 0.1% to about 2.0% as based on the weight of said barium sulfate particles effective to bond said polysiloxane to the surfaces of said barium sulfate particles via a chemical reaction between Si—H groups of the polysiloxane and the surfaces of the barium sulfate particles.

15. The method of claim 14, wherein n is about 50–80; R is a methyl group; Y is $(CH_3)_3SiO$—; and Z is —$Si(CH_3)_3$.

16. The method of claim 14, further including the step of drying said surface treated particles.

17. The method of claim 14, further including the step of pulverizing said surface treated particles.

18. The method of claim 14, wherein said aqueous emulsion includes the polysiloxane in an active basis amount of from about 30 to about 70% by weight and a surfactant in an active basis amount of from about 1.0% to about 3.0% by weight.

19. The method of claim 18, wherein said surfactant is nonionic, and said nonionic surfactant has a hydrophilic lypophilic balance value of at least about 9.

20. The method of claim 14, wherein said barium sulfate particles have a median particle size from about 0.1 to about 10 microns.

21. The method of claim 14, wherein said aqueous emulsion is mixed with said barium sulfate particles in an active basis amount of from about 0.5% to about 1.5% by weight of said polysiloxane as based on the weight of said barium sulfate particles.

22. A polymeric resin composition, comprising:

a polymeric resin; and a plurality of barium sulfate particles mixed with said polymeric resin, said barium sulfate particles having surfaces and a surface-modifying material bonded to said surfaces, where the surface-modifying material comprises a polysiloxane represented by the general formula:

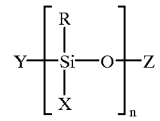

wherein n=an integer greater than 1;

X=H;

R=a $C_1$ to $C_{20}$ alkyl group; and

Y and Z=silicon-containing terminating end groups.

23. The polymeric composition of claim 22, wherein said polymeric resin is selected from the group consisting of polyolefin and polyvinyl chloride.

24. The polymeric composition of claim 22, wherein R is a methyl group.

25. The polymeric composition of claim 22, wherein n is about 50–80; R is a methyl group; Y is $(CH_3)_3SiO$—; and Z is —$Si(CH_3)_3$.

26. The polymeric composition of claim 22, wherein said barium sulfate particles have a median particle size of approximately 0.1 to 10 microns.

27. The polymeric composition of claim 22, wherein the surface-modifying material consists essentially of said polysiloxane.

* * * * *